(12) United States Patent
Kresse et al.

(10) Patent No.: US 9,537,692 B2
(45) Date of Patent: Jan. 3, 2017

(54) AUTOMATION DEVICE OPERABLE TO CONVERT BETWEEN DATA BYTE STREAMS AND FREQUENCY MODULATED LINE SIGNALS

(75) Inventors: Heiko Kresse, Obernkirchen (DE); Andreas Stelter, Minden (DE); Ralf Schaeffer, Hille (DE)

(73) Assignee: ABB PATENT GMBH (DE)

( * ) Notice: Subject to any disclaimer, the term of this patent is extended or adjusted under 35 U.S.C. 154(b) by 884 days.

(21) Appl. No.: 11/508,529

(22) Filed: Aug. 23, 2006

(65) Prior Publication Data

US 2007/0150625 A1    Jun. 28, 2007

(30) Foreign Application Priority Data

Aug. 31, 2005    (DE) .................. 10 2005 041 455

(51) Int. Cl.
*G06F 13/38*    (2006.01)
*H04L 27/12*    (2006.01)

(52) U.S. Cl.
CPC .................. *H04L 27/122* (2013.01)

(58) Field of Classification Search
CPC ..................................... H04L 27/122
USPC .............................. 710/260–269
See application file for complete search history.

(56) References Cited

U.S. PATENT DOCUMENTS

| | | |
|---|---|---|
| 4,075,558 A | 2/1978 | Harzer |
| 4,099,030 A | 7/1978 | Hirata |
| 4,104,637 A | 8/1978 | Nielson |
| 4,259,648 A | 3/1981 | Farrow |
| 4,287,565 A | 9/1981 | Haubner et al. |
| 4,438,523 A | 3/1984 | Brandl |
| 4,521,879 A | 6/1985 | Gueldenpfennig et al. |
| 4,533,874 A | 8/1985 | Fischer |
| 4,541,110 A | 9/1985 | Hopf et al. |
| 4,549,044 A | 10/1985 | Durham |
| 4,586,121 A | 4/1986 | Gilliam |
| 4,663,709 A * | 5/1987 | Fujiwara et al. ............. 710/267 |
| 4,672,361 A | 6/1987 | Kokubo et al. |
| 4,724,534 A | 2/1988 | Guzman-Edery et al. |
| 4,749,962 A | 6/1988 | Doornenbal |
| 4,773,083 A | 9/1988 | Baumbach et al. |
| 4,887,164 A * | 12/1989 | Takahashi ..................... 358/443 |
| 5,048,058 A | 9/1991 | Kaleh |
| 5,103,463 A * | 4/1992 | Schoeneberg ................. 375/278 |
| 5,121,723 A | 6/1992 | Stepper et al. |
| 5,124,976 A * | 6/1992 | Lemaistre et al. ............ 370/294 |

(Continued)

*Primary Examiner* — Nimesh G Patel
(74) *Attorney, Agent, or Firm* — Taft Stettinius & Hollister

(57) ABSTRACT

The invention relates to an automation device, in which a plurality of spatially distributed functional units communicate with one another by means of a common transmission protocol. The device has a microcontroller (110) which has at least one associated clock generator (120) and a memory unit (150) and which is connected at least to a data source (140), which is designed to output a data byte stream to be transmitted. A first program for conversion of a data byte stream to be transmitted to a sequence of sample values of an adequate frequency-modulated line signal, and a second program for identification of a frequency-modulated line signal and for its sequential conversion to a received data byte stream are stored in the memory unit (150), with these programs being associated with the microcontroller (110). The first and the second program can be run alternately.

7 Claims, 1 Drawing Sheet

(56) References Cited

U.S. PATENT DOCUMENTS

| | | |
|---|---|---|
| 5,225,787 A | 7/1993 | Therssen |
| 5,230,012 A | 7/1993 | Schenk |
| 5,233,642 A | 8/1993 | Renton |
| 5,235,622 A | 8/1993 | Yoshida |
| 5,239,974 A | 8/1993 | Ebinger et al. |
| 5,260,975 A | 11/1993 | Saito |
| 5,341,249 A | 8/1994 | Abbott et al. |
| 5,341,379 A | 8/1994 | Crisp |
| 5,555,531 A | 9/1996 | Booth et al. |
| 5,584,619 A * | 12/1996 | Guzzella ............... 408/9 |
| 5,602,879 A | 2/1997 | Wada |
| 5,652,755 A | 7/1997 | Carey |
| 5,655,841 A * | 8/1997 | Storm ............... 374/183 |
| 5,661,759 A | 8/1997 | Tulai |
| 5,710,721 A * | 1/1998 | Rieckhoff et al. ......... 714/51 |
| 5,764,891 A * | 6/1998 | Warrior ............... 710/72 |
| 5,789,991 A | 8/1998 | Ishii |
| 5,920,715 A * | 7/1999 | Heckel et al. ......... 712/32 |
| 5,963,332 A | 10/1999 | Feldman et al. |
| 6,021,162 A * | 2/2000 | Gaboury et al. ......... 375/242 |
| 6,107,763 A | 8/2000 | Rossi |
| 6,230,021 B1 | 5/2001 | Ohdachi |
| 6,278,357 B1 | 8/2001 | Croushore et al. |
| 6,286,020 B1 | 9/2001 | Eastty et al. |
| 6,307,490 B1 | 10/2001 | Litfin |
| 6,308,057 B1 | 10/2001 | Hayashi |
| 6,438,176 B1 | 8/2002 | Haran et al. |
| 6,449,715 B1 | 9/2002 | Krivoshein |
| 6,629,059 B2 | 9/2003 | Borgeson et al. |
| 6,650,712 B1 | 11/2003 | Leonidov et al. |
| 6,675,236 B2 * | 1/2004 | Moon et al. ............... 710/29 |
| 6,759,954 B1 * | 7/2004 | Myron et al. ............... 340/522 |
| 6,813,318 B1 * | 11/2004 | Westfield et al. ......... 375/295 |
| 6,888,879 B1 * | 5/2005 | Lennen ............... 375/149 |
| 6,889,282 B2 | 5/2005 | Schollenberger ......... 710/305 |
| 6,904,476 B2 * | 6/2005 | Hedtke ............... 710/72 |
| 6,959,356 B2 * | 10/2005 | Packwood et al. ......... 710/315 |
| 7,010,459 B2 * | 3/2006 | Eryurek et al. ......... 702/182 |
| 7,012,561 B2 | 3/2006 | Toennesen et al. |
| 7,027,952 B2 | 4/2006 | Dela Cruz et al. |
| 7,050,525 B2 | 5/2006 | Adachi et al. |
| 7,054,982 B2 * | 5/2006 | Choi et al. ............... 710/305 |
| 7,228,186 B2 * | 6/2007 | Karschnia et al. ......... 700/19 |
| 7,321,846 B1 * | 1/2008 | Huisenga et al. ......... 702/183 |
| 7,358,781 B2 | 4/2008 | Kresse et al. |
| 7,359,812 B2 | 4/2008 | Kresse et al. |
| 7,372,914 B2 | 5/2008 | Calvin |
| 7,386,052 B2 | 6/2008 | Kresse et al. |
| 7,426,452 B2 | 9/2008 | Zielinski et al. |
| 7,447,552 B2 | 11/2008 | Kresse et al. |
| 7,663,350 B2 * | 2/2010 | Kirst ............... 323/268 |
| 7,864,675 B2 | 1/2011 | Kresse et al. |
| 2001/0030997 A1 | 10/2001 | Yang et al. |
| 2002/0082799 A1 * | 6/2002 | Pramanik ............... 702/130 |
| 2002/0101943 A1 | 8/2002 | Proctor |
| 2002/0167904 A1 | 11/2002 | Borgeson et al. |
| 2003/0065855 A1 * | 4/2003 | Webster ............... 710/260 |
| 2004/0073402 A1 * | 4/2004 | DelaCruz et al. ......... 702/183 |
| 2004/0146126 A1 | 7/2004 | Wheatley et al. |
| 2004/0151269 A1 | 8/2004 | Balakrishnan et al. |
| 2004/0239525 A1 | 12/2004 | Kobayashi |
| 2005/0072227 A1 | 4/2005 | Carter |
| 2005/0089120 A1 | 4/2005 | Quinlan et al. |
| 2005/0129147 A1 | 6/2005 | Cannon et al. |
| 2005/0195093 A1 | 9/2005 | Karschnia et al. |
| 2005/0264446 A1 | 12/2005 | Underbrink et al. |
| 2006/0092039 A1 * | 5/2006 | Saito et al. ............... 340/825.37 |
| 2007/0115851 A1 | 5/2007 | Kresse et al. |
| 2007/0115852 A1 | 5/2007 | Kresse et al. |
| 2007/0116040 A1 | 5/2007 | Kresse et al. |
| 2007/0116133 A1 | 5/2007 | Kresse et al. |
| 2007/0118686 A1 | 5/2007 | Kresse et al. |
| 2007/0126498 A1 | 6/2007 | Kresse et al. |
| 2007/0136538 A1 | 6/2007 | Kresse et al. |
| 2007/0150625 A1 | 6/2007 | Kresse et al. |
| 2007/0150626 A1 | 6/2007 | Kresse et al. |

* cited by examiner

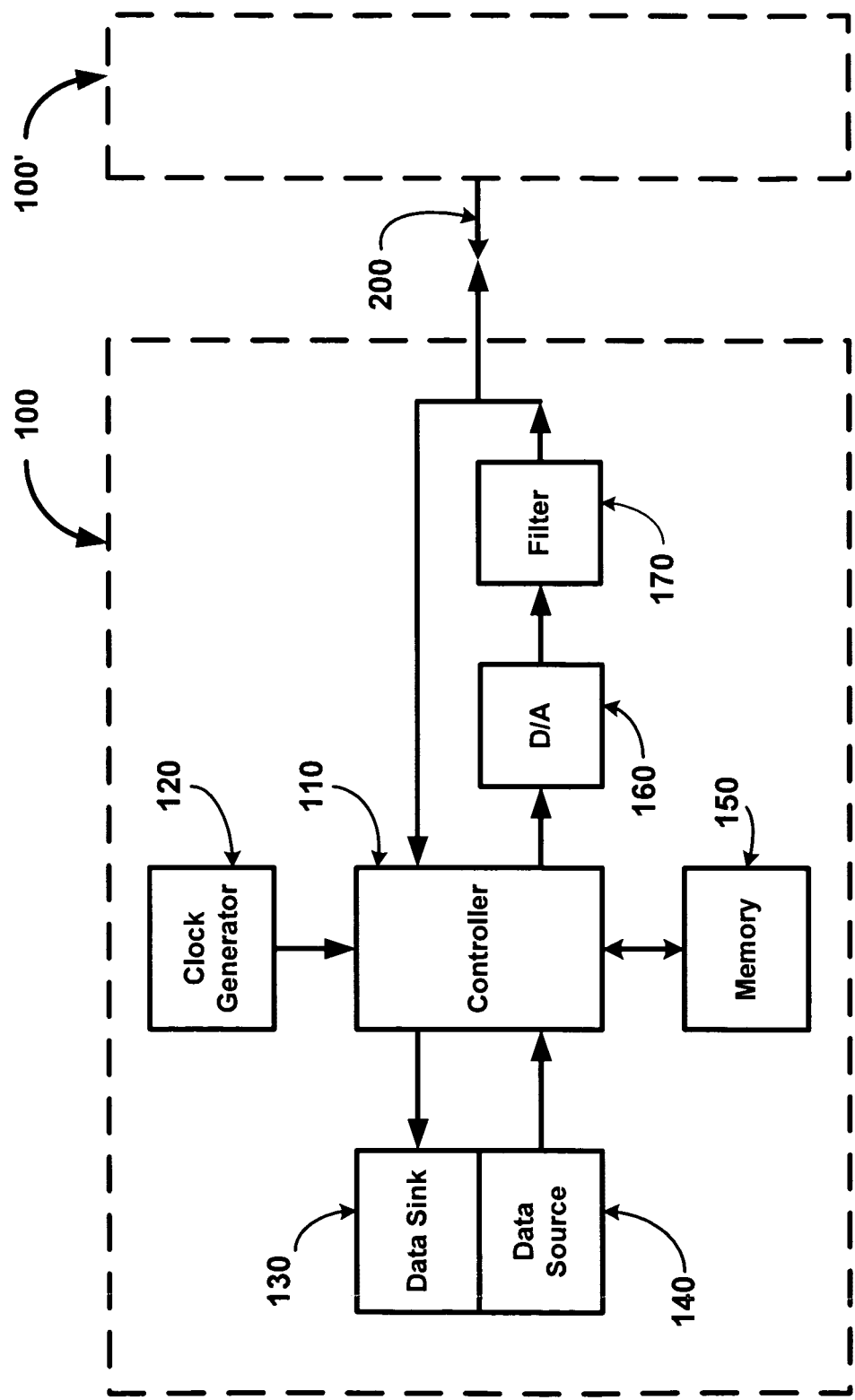

AUTOMATION DEVICE OPERABLE TO CONVERT BETWEEN DATA BYTE STREAMS AND FREQUENCY MODULATED LINE SIGNALS

CROSS REFERENCE TO RELATED APPLICATION

This application claims priority from Germany Application DE 10 2005 041 455.9 filed on Aug. 31, 2005 the contents of which are relied upon and incorporated herein by reference in their entirety, and the benefit of priority under 35 U.S.C. 119 is hereby claimed.

BACKGROUND OF THE INVENTION

The invention relates to an automation device, in which a plurality of spatially distributed functional units communicate with one another by means of a common transmission protocol. These functional units are in the form of field devices or control devices, corresponding to their automation functions.

In the field of measurement, open-loop and closed-loop control engineering, it has been customary for a relatively long time for a field device to be fed via a two-wire line and for measured values to be transmitted from this field device to a display device, and/or to a control installation, and/or for actuation values to be transmitted from a control installation to the field device. In this case, each measured value and/or actuation value is converted to a proportional direct current, which is superimposed on the feed direct current, in which case the direct current which represents the measured value or the actuation value may be a multiple of the feed direct current. By way of example, the feed current drawn by the field device is normally set to about 4 mA, and the dynamic range of the measured value or of the actuation value is mapped onto currents between 0 and 16 mA, so that it is possible to use the known 4 . . . 20 mA current loop.

More modern field devices are furthermore distinguished by universal characteristics, which can largely be adapted to the respective process. For this purpose, an alternating-current transmission path which can be operated bidirectionally is provided in parallel to the unidirectional direct-current transmission path, via which configuration data can be transmitted in the direction of the field device, and measured values and state data can be transmitted in the direction from the field device. The configuration data and the measured values as well as the state data are modulated, preferably frequency-modulated, onto an AC voltage.

In process control engineering, it is normal practice in the so-called field area to arrange in situ and to link field devices, that is to say measurement, actuation and display assemblies, in accordance with the predetermined safety conditions. These field devices have analog and digital interfaces for data transmission to one another. The data is in this case transmitted via the feed lines of the power supply, which is arranged in the console area. Controllers are also provided in the so-called console area for remote control and remote diagnosis of these field devices, the safety regulations relating to which are normally not very stringent.

The data transmission between the controllers in the console area and the field devices is carried out by superimposition of the known 20 mA current loops with the aid of FSK (frequency shift keying) modulation. In this case, two frequencies, which are associated with the binary states "0" and "1", are transmitted in analog form, in frames.

The frame conditions for the FSK signal and the nature of the modulation are described in the "HART Physical Layer Specification Revision 7.1-Final" dated Jun. 20, 1990 (Rosemount Document No. D8900097; Revision B).

ASICs which have been designed specifically for this purpose, such as HT2012 from the company SMAR, are commercially available and in use for implementation of the FSK interface based on the HART protocol. These special circuits have the disadvantage that the functional scope is fixed and cannot be changed, and the lack of flexibility associated with this for adaptation to changing requirements is likewise disadvantageous.

Known modern automation devices are normally equipped with a processor unit, a so-called microcontroller, which is used for data processing in accordance with the stipulations, as a function of the automation task of the relevant functional unit.

SUMMARY OF THE INVENTION

Thus, in detail, the invention is based on the object of mapping the functions of the FSK interface according to HART protocol in the control of the processing unit of the automation devices, without in the process adversely affecting the automation task of the relevant functional unit.

The invention is based on a microcontroller which has at least one associated clock generator and a memory unit for storage of instructions and data. This microcontroller is connected at least to a data source, which is designed to output a data byte stream to be transmitted, and a data sink, in order to accept a received data byte stream.

The microcontroller has a first associated program for conversion of a data byte stream to be transmitted to a sequence of sample values of an adequate frequency-modulated line signal. Furthermore, the microcontroller has a second associated program for identification of a frequency-modulated line signal and for its sequential conversion to a received data byte stream. The first and the second program are stored in the memory unit such that they can be called up. Furthermore, the first and the second program can be run alternately.

The data byte stream which is kept available in the data source and is to be transmitted is read into the microcontroller in a quantized form. A sequence of successive sample values is emitted as a first and a second frequency as a function of the logic value of each byte to be transmitted. In this case, the first frequency represents a logic zero and the second frequency a logic one.

For this purpose, it is possible to provide for the successive sample values to be stored in a table, which is stored in the memory unit such that it can be called up.

In a further refinement of the invention, a digital/analog converter is connected on the transmission side to this microcontroller, and is followed by a filter. The successive sample values are thus transferred to a closed time profile of a frequency-modulated line signal.

In the receiving direction, a frequency-modulated line signal is passed to the microcontroller via an analog/digital converter, which may be a component of the microcontroller, and is read into the microcontroller in a quantized form. The line signal that is read in comprises a sequence of alternately successive sequences in a time pattern, at a first and at a second frequency. In this case, the first frequency represents a logic zero and the second frequency a logic one. The associated transmitted byte value is determined for each time pattern field from the time profile of the received line signal, and is output to the data sink.

The production and identification of the line signal in a unit with the implementation of the protocol functions advantageously results in the automation devices being flexibly matched to dynamic extensions to the transmission protocol. This allows the functional scope of the interface to be flexibly matched to the needs and to changing requirements.

A further feature of the invention provides for the running of the first and of the second program to be initiated in each case by an interrupt request. This advantageously means that the processing of the first program is decoupled from the processing of the second program.

A further feature of the invention provides for the interrupt request to be time-controlled. This advantageously removes the load of unproductive program steps from the microcontroller.

A further feature of the invention provides for the interrupt request to be periodic.

BRIEF DESCRIPTION OF THE DRAWING

The invention will be explained in more detail in the following text with reference to one exemplary embodiment. The single FIGURE shows, in principle, an automation device 100, to the extent required for understanding of the present invention.

DETAILED DESCRIPTION OF ILLUSTRATIVE EMBODIMENTS

The automation device 100 is connected via a communication line 200 to an essentially identical automation device 100'. The communication line 200 is used bidirectionally. The information which is sent from the automation device 100 is received by the automation device 100', and vice versa. In the following text, reference is therefore made only to the automation device 100, which will be described in detail.

A core component of the automation device 100 is a controller 110, which is connected at least to a memory 150 and to a timing unit, referred to for the sake of simplicity in the following text as a clock generator 120. However, parts of the clock generator 120 are normally already implemented in the controller 110.

The controller 110 has connections for connection of a data sink 130 and of a data source 140.

A sensor for conversion of a physical variable to an electrical variable may be provided as the data source 140, and is configurable. In this case, the configuration is the data sink 130.

In an alternative embodiment, it is possible to provide for the data sink 130 to be an actuator for conversion of an electrical variable to a physical variable, whose characteristics can be diagnosed. The diagnosis device provided for this purpose is then the data source 140.

In a further embodiment, it is possible to provide for the automation device 100 to be a component of a higher-level device which is designed for bidirectional communication with further automation devices 100'. In this embodiment, the higher-level device is both the data source 140 and the data sink 130.

In a further embodiment, the automation device 100 may be in the form of a so-called protocol converter. In this embodiment, the higher-level device is the data source 140, and the data sink 130 is formed by a second communication system.

However, the presence of the data source 140 without any data sink 130 is adequate to carry out the invention.

Furthermore, a digital/analog converter 160 is connected to the controller 110, and is followed by a filter 170. The output of the filter 170 is connected to the communication line 200. Furthermore, the communication line 200 is passed to input connections of the controller 110, via which the line signal can be received on the communication line 200.

The controller 110 has a first associated program for conversion of a data byte stream to be transmitted to a sequence of sample values of an adequate frequency-modulated line signal. Furthermore, the controller 110 has a second associated program for identification of a frequency-modulated line signal, and for its sequential conversion to a received data byte stream. The first and the second program are stored in the memory 150 such that they can be called up. The first and the second program can be run alternately.

The data byte stream which is kept available in the data source 140 and is to be transmitted is read into the controller 110 in a quantized form. A sequence of successive sample values is output at a first or second frequency as a function of the logic value of each byte to be transmitted. In this case, the first frequency represents a logic zero, and the second frequency a logic one.

For this purpose, it is possible to provide for the successive sample values to be stored in a table, which is stored in the memory 150 such that it can be called up.

In a further refinement of the invention, a digital/analog converter 160 is connected on the transmission side to this controller 110, and is followed by a filter 170. The successive sample values are thus transferred to a closed time profile of a frequency-modulated line signal, and are output to the communication line 200.

In the receiving direction, a frequency-modulated line signal is passed from the communication line 200 to the controller 110, and is ready in a quantized form. The line signal that is read in comprises a sequence in a time pattern of alternately successive sequences at a first and a second frequency. In this case, the first frequency represents a logic zero, and the second frequency a logic one. The associated transmitted byte value is determined from the time profile of the received line signal for each time pattern field, and is output to the data sink 130.

The production and identification of the line signal in a unit with the implementation of the protocol functions advantageously result in flexible matching of the automation devices to dynamic extensions to the transmission protocol. The functional scope of the interface can thus be flexibly matched to the needs and to changing requirements.

A further refinement of the invention provides for the capability for the running of the first and of the second program to be initiated in each case by an interrupt request. This advantageously decouples the processing of the first program from the processing of the second program.

A further refinement of the invention provides for the interrupt request to be time-controlled. A timer which starts itself recursively can be provided for this purpose in a very simple manner. A timer such as this is normally already an integral component of the controller 110. This advantageously removes the load of unproductive program steps from the microcontroller.

A further refinement of the invention provides for the interrupt request to be periodic. A timer can be provided in a very simple manner for this purpose, which starts itself recursively and initiates the interrupt request. A timer such as this is normally already an integral component of the controller 110.

What is claimed is:

1. An automation device, for connection to a second automation device via a single communication line, the automation device comprising: a data sink, a data source, a microcontroller with a least one associated clock generator and a memory unit, the microcontroller having a first associated program for conversion of a first data byte stream, which is received from the data source, to a sequence of sample values of a first frequency-modulated line signal, which is subsequently transmitted to the second automation device via the communication line, and the first program is stored in the memory unit, the microcontroller further having a second associated program for identification of a second frequency modulated line signal, which is received from the second automation device via the communication line, and for its sequential conversion to a second data byte stream, which is subsequently transmitted to the data sink, and the second program is stored in the memory unit, and the first and the second programs are run alternately.

2. The automation device as claimed in claim 1, wherein the running of the first and second programs can be initiated in each case by an interrupt request.

3. The automation device as claimed in claim 2, wherein the interrupt request is time-controlled.

4. The automation device as claimed in claim 3, wherein the interrupt request is periodic.

5. The automation device as claimed in claim 1, wherein the data source is a configurable sensor for converting a physical variable to an electrical variable, and wherein data sink is a configuration of the sensor.

6. The automation device as claimed in claim 1, wherein the data sink is an actuator for converting an electrical variable to a physical variable, and wherein the data source is a device for diagnosing characteristics of the actuator.

7. An automation device for connection to a second automation device via a single communication line, the automation device comprising:
   a data sink, a data source, a memory unit, and a microcontroller with at least one associated clock generator, the memory unit having written thereupon:
      a first associated program that upon execution by the microcontroller converts a first data byte stream received from the data source to a sequence of sample values of a first frequency-modulated line signal, and transmits the first frequency-modulated line signal to the second automation device via the communication line connecting the first and second automation device, and,
      a second associated program run alternately relative to the first associated program, that upon execution by the microcontroller identifies a second frequency-modulated line signal received from the second automation device via the communication line, converts the second frequency-modulated line signal to a second data byte stream, and transmits the second data byte stream to the data sink.

* * * * *